US007022414B2

(12) United States Patent
Davina et al.

(10) Patent No.: US 7,022,414 B2
(45) Date of Patent: Apr. 4, 2006

(54) MOLDED SKIN WITH CURVATURE

(75) Inventors: Glenn Davina, Klamath Falls, OR (US); Stanley K. Meyers, Klamath Falls, OR (US)

(73) Assignee: Jeld-Wen, inc., Klamath Falls, OR (US)

( * ) Notice: Subject to any disclaimer, the term of this patent is extended or adjusted under 35 U.S.C. 154(b) by 0 days.

(21) Appl. No.: 10/426,573

(22) Filed: Apr. 30, 2003

(65) Prior Publication Data

US 2004/0219382 A1 Nov. 4, 2004

(51) Int. Cl.
*B32B 23/04* (2006.01)

(52) U.S. Cl. ....................... 428/534; 428/532; 428/174; 428/220; 428/541; 52/309.13; 52/455; 52/784.1; 52/745.15; 52/745.16; 264/119; 264/251

(58) Field of Classification Search ................. 428/532, 428/534, 174, 220, 541; 52/309.13, 455, 52/784.1, 745.15, 745.16; 264/119, 251

See application file for complete search history.

(56) References Cited

U.S. PATENT DOCUMENTS

| | | | |
|---|---|---|---|
| 619,676 | A | 2/1899 | Cronin |
| 670,939 | A | 4/1901 | Rapp |
| 877,922 | A | 2/1908 | Gager |
| 1,183,842 | A | 5/1916 | Alling |
| D132,040 | S | 4/1942 | Cummings |
| 2,343,740 | A | 3/1944 | Birmingham |
| 2,682,083 | A | 6/1954 | Patton |
| 2,797,450 | A | 7/1957 | Ropella |
| 2,831,793 | A | 4/1958 | Elmendorf |
| 3,098,781 | A | 7/1963 | Greten |
| 3,121,263 | A | 2/1964 | Binner |
| 3,212,948 | A | 10/1965 | McMahon |
| 3,308,013 | A | 3/1967 | Bryant |
| 3,484,994 | A | 12/1969 | Ashby et al. |
| 3,512,304 | A | 5/1970 | Meuret |
| 3,533,190 | A | 10/1970 | Hilfinger et al. |
| 3,546,841 | A | 12/1970 | Smith et al. |
| D222,775 | S | 12/1971 | Sartori |

(Continued)

FOREIGN PATENT DOCUMENTS

| | | |
|---|---|---|
| CA | 57271 | 10/1986 |
| DE | 3801486 A1 | 8/1989 |
| EP | 0 049 299 B1 | 4/1982 |
| EP | 0 103 048 A2 | 3/1984 |
| EP | 0 225 629 B2 | 6/1987 |
| EP | 0 346 640 A1 | 12/1989 |
| EP | 0 688 639 A3 | 3/1996 |
| EP | 1 190 825 A2 | 3/2002 |
| EP | 1 473 127 A3 | 3/2005 |

OTHER PUBLICATIONS

Wood Handbook: Wood as an Engineering Material, United States Department of Agriculture, , Mar. 1999, Chapter 10, pp. 3 and 17.*

Merriam Webster Online Dictionary, definition of the term "adjacent".*

"Factory–Fitted Douglas Fir Entrance Doors," U. S. Department of Commerce, Commercial Standard CS91–41, Feb. 10, 1941.

Douglas Fir Doors, E. A. Nord Company, Specifications of Pacific Northwest Fir Doors, 3 pages, 1953.

Mercer, Henry C., Sc. D., "Ancient Carpenter's Tools," The Bucks County Historical Society, Doylestown, PA, p. 131–133, 1960.

Architectural Woodwork Quality Standards, Guide Specifications and Quality Certification Program, Fifth Edition, The Architectural Woodwork Institute, p. 109.

Lloyd, William B., Millwork Principles and Practices, Manufacture–Distribution–Use, Cahners Publishing Company, Inc., Chicago, IL., in assoc. with The National Woodwork Manufacturers Association, Inc., Table of Contents, pp. 192, 241, 116–117, 167, 173 © 1966.

Feirer, John L., Cabinetmaking and Millwork, Chas A. Bennett Co., Inc., Peoria, IL., pp. 4, 8–14, 145–146, 596–597, 684–687, ©1967.1970.

A recorded voluntary standard of the trade published by the U. S. Dept. of Commerce, Commercial Standard CS73–61, Old Growth Douglas Fir, Sitka Spruce and Western Hemlock Doors, 3 pgs., effective Mar. 20, 1961.

1981 Sweet's Catalogue, Section 8–3/50, p. 7.

Hechinger Brochure—dated Mar. 16, 1986.

Masonite Brand Door Facings—brochure, published in 1987.

Elite Doors—brochure, apparently published in Oct. 1987.

Quality Doors Brochure © 1988.

"The New Mission Series" product brochure by Nord, Part of the Jeld–Wen family, 300 W. Marine View Drive, Everett, WA 98201–1030, in existence at least as of Oct. 29, 2002.

1981 Sweet's Catalogue, Section 9.31/MO, P. 3, door in center of page.

VISADOR Brochure, date unknown.

*Primary Examiner*—Randy Gulakowski
*Assistant Examiner*—Christopher Keehan
(74) *Attorney, Agent, or Firm*—Nelson Mullins Riley & Scarborough, LLP

(57) ABSTRACT

Molded skins and methods of making molded skins are disclosed. An embodiment of a skin includes a sheet having first and second surfaces, a first arcuate portion integral with the sheet, and a second arcuate portion integral with the sheet and adjacent to the first arcuate portion. The sheet includes a cellulosic material. The first arcuate portion includes a first surface and a second surface, each having an arc. The second arcuate portion includes a first surface and a second surface, each having an arc. An angle forming the arc of the first surface of the first arcuate portion is greater than 110 degrees and an angle forming the arc of the first surface of the second arcuate portion is less than 102 degrees.

42 Claims, 4 Drawing Sheets

U.S. PATENT DOCUMENTS 3,639,200 A 2/1972 Elmendorf et al.
3,793,125 A 2/1974 Kunz
3,796,586 A 3/1974 Hanlon et al.
3,899,860 A 8/1975 Newell
3,987,599 A 10/1976 Hines
D244,736 S 6/1977 Palka
D245,824 S 9/1977 Palka
4,104,828 A 8/1978 Naslund et al.
4,142,007 A 2/1979 Lampe et al.
4,146,662 A 3/1979 Eggers et al.
4,183,187 A 1/1980 Simard
4,236,365 A 12/1980 Wheeler
4,246,310 A 1/1981 Hunt et al.
4,248,163 A 2/1981 Caughey et al.
4,268,565 A 5/1981 Luck et al.
4,277,428 A 7/1981 Luck et al.
D266,042 S 9/1982 Moore et al.
D266,720 S 11/1982 Moore et al.
4,361,612 A 11/1982 Shaner et al.
4,364,984 A 12/1982 Wentworth
4,441,296 A 4/1984 Grabendike et al.
D274,107 S 6/1984 Gordon
D274,944 S 7/1984 Coppa
4,503,115 A 3/1985 Hemels et al.
4,544,440 A 10/1985 Wheeler
4,550,540 A 11/1985 Thorn
4,552,797 A 11/1985 Munk et al.
D282,426 S 2/1986 Heimberger et al.
4,579,613 A 4/1986 Belanger
4,610,900 A 9/1986 Nishibori
4,610,913 A 9/1986 Barnes
D286,177 S 10/1986 Case et al.
4,622,190 A 11/1986 Schultz
4,643,787 A 2/1987 Goodman
D292,766 S 11/1987 Palka
4,706,431 A 11/1987 Corvese
4,720,363 A 1/1988 Mayumi et al.
4,811,538 A 3/1989 Lehnert
4,830,929 A 5/1989 Ikeda et al.
4,853,062 A 8/1989 Gartland
4,876,838 A 10/1989 Hagemeyer
D304,983 S 12/1989 Palka
4,896,471 A 1/1990 Turner
4,908,990 A 3/1990 Yoon et al.
4,942,084 A 7/1990 Prince
D311,957 S 11/1990 Hall
D314,242 S 1/1991 Mikolaitis
D314,625 S 2/1991 Hall
5,016,414 A 5/1991 Wang
D319,884 S 9/1991 Hall
5,074,087 A 12/1991 Green
5,074,092 A 12/1991 Norlander
5,075,059 A 12/1991 Green
5,142,835 A 9/1992 Mrocca
5,167,105 A 12/1992 Isban et al.
D335,982 S 6/1993 Brandon
5,219,634 A 6/1993 Aufderhaar
D338,718 S 8/1993 Izzo
5,239,799 A 8/1993 Bies et al.
5,262,217 A 11/1993 Blaauw
5,293,726 A 3/1994 Schick
D349,352 S 8/1994 Csati
5,355,654 A 10/1994 Stanley
5,369,869 A 12/1994 Bies et al.
5,397,406 A 3/1995 Vaders
5,401,556 A 3/1995 Ishitoya et al.
5,443,891 A 8/1995 Bach
5,470,631 A 11/1995 Lindquist et al.
D366,939 S 2/1996 Schafernak
D367,121 S 2/1996 Schafernak
D370,269 S 5/1996 Schafernak
D371,852 S 7/1996 Schafernak
5,543,234 A 8/1996 Lynch et al.
D375,424 S 11/1996 Burwick
D382,350 S 8/1997 Lynch
D388,196 S 12/1997 Schafernak et al.
5,766,774 A 6/1998 Lynch et al.
5,887,402 A 3/1999 Ruggie et al.
D411,022 S 6/1999 Schafernak et al.
D426,645 S 6/2000 Bonomo et al.
6,073,419 A 6/2000 Moyes
6,200,687 B1 3/2001 Smith et al.
6,588,162 B1 7/2003 Lynch et al.
2001/0026862 A1 10/2001 Smith et al.

* cited by examiner

MOLDED SKIN WITH CURVATURE

FIELD OF THE INVENTION

The invention generally relates to skins, and more particularly, to molded skins.

BACKGROUND

For aesthetic reasons, it may be desirable for a door skin to have two adjacent half-round curvatures, i.e., curvatures of greater than 90 degrees. Metal doors are known to have such configurations. Metal doors, however, can be damaged somewhat easily, for example, by denting. Additionally, metal doors can be heavy to ship, cumbersome to install, and costly.

Fiberglass doors are also known to have adjacent, sharp curved portions. While fiberglass is not damaged easily and is light-weight compared to metal, it is one of the more costly materials to use for doors. Furthermore, over time, ultraviolet light degrades the coating of the fiberglass door, and ultimately, destroys the face of the door.

Fiberboard door skins have the advantages of being economical, not easily damaged, and durable over time. However, when forming fiberboard door skins with curvatures greater than 90 degrees, proper surface consistency and density have been extremely difficult to achieve. When a fiberboard mat is molded, i.e., stretched, to include two adjacent bends of at least 90 degrees, the added contours increase the amount of surface distance of the mat compared to a substantially flat mat. Stretching the fiberboard mat farther than desirable, i.e., over-stretching, results in surface discontinuities and flaws such that paint, stains, and other finishes do not properly adhere to the surface of the mat.

Prior attempts at forming fiberboards having two adjacent half-round curvatures as described below have resulted in door skins being either too porous or too dense. In regions where the skin is too porous, i.e., the density is too low, paint, stains, and other finishes do not adhere to the surface but rather, are absorbed by the wood. Such surfaces appear rough or uncovered.

In regions where such a skin has an unusually high density, the surface blisters and cracks. Paint, stains, and other finishes cannot adhere to such surfaces, and generally appear darker when compared to other regions where the density is within acceptable ranges. A door surface having such an uneven appearance is generally considered to be aesthetically unpleasing. Additionally, there are discontinuities and flaws in the surfaces of such door skins in such situations.

Attempts have been made to compensate or correct for such density extremes. One such attempt includes increasing the density of regions where low densities are expected when molding the door skin. This approach, while successful in gradual curvatures of the surface, such as, for example, quarter curves, has not been successful for the curvatures described above. Blistering and cracking of the surface still occurs in this approach.

Other approaches have been attempted, and have been unsuccessful as well. Once a fiberboard door skin has been formed with a density that is either too low or too high, there are no known solutions to remedy or correct problems with the surface appearance and consistency of door skins. Thus, such door skins must be discarded, which ultimately increases the costs of door production.

SUMMARY OF THE INVENTION

Embodiments of the present invention include skins and methods of making molded skins that include door skins having two adjacent half-round curvatures in the profile. Embodiments of the present invention may take a wide variety of forms. In one exemplary embodiment, a skin includes a sheet having first and second surfaces, a first arcuate portion integral with the sheet, and a second arcuate portion integral with the sheet and adjacent with the first arcuate portion. The sheet includes a cellulosic material. The first arcuate portion includes a first surface and a second surface, each having an arc. The second arcuate portion also includes a first surface and a second surface, each having an arc. An angle forming the arc of the first surface of the first arcuate portion is greater than 110 degrees and an angle forming the arc of the first surface of the second arcuate portion is less than 102 degrees.

In another exemplary embodiment, a method includes a method of making a skin. The method includes providing a sheet having cellulosic material, molding a first arcuate portion integral with the sheet, and molding a second arcuate portion integral with the sheet and adjacent to the first arcuate portion. The first and second arcuate portions each include first and second surfaces having an arc. An angle forming the arc of the first surface of the first arcuate portion is greater than 110 degrees and an angle forming the arc of the first surface of the second arcuate portion is less than 102 degrees.

One advantage of the present invention can be to provide a molded skin with two adjacent half-round curvatures.

Another advantage of the present invention can be to provide a molded fiberboard skin with a proper density for surface finishing.

Yet another advantage of the present invention can be to provide a molded skin that exhibits a substantially uniform surface appearance.

A further advantage of the present invention can be to provide a molded fiberboard skin with a profile that is similar to profiles of metal and fiberglass skins.

Yet a further advantage of the present invention can be to provide a molded skin with a profile having a surface distance greater than a linear distance.

These exemplary embodiments are mentioned not to summarize the invention, but to provide an example of an embodiment of the invention to aid understanding. Exemplary embodiments are discussed in the Detailed Description, and further description of the invention is provided there. Advantages offered by the various embodiments of the present invention may be understood by examining this specification.

BRIEF DESCRIPTION OF THE DRAWINGS

The accompanying drawings, which constitute part of this specification, help to illustrate embodiments of the invention. In the drawings, like numerals are used to indicate like elements throughout.

DETAILED DESCRIPTION

Figure 1:
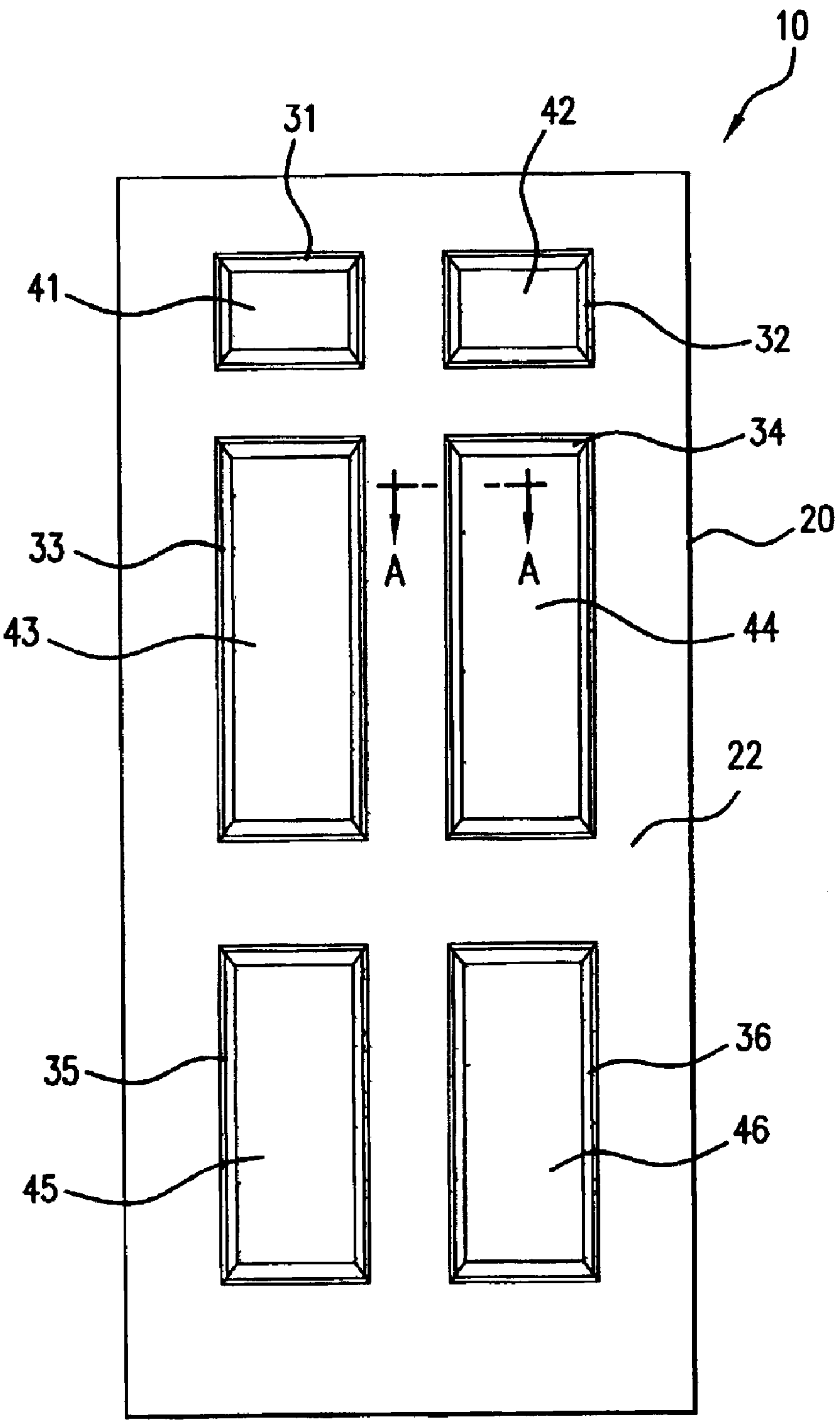
FIG. 1 is a perspective view of a skin according to an embodiment of the present invention.

Embodiments of the invention include products and processes for molding a skin. A sheet typically comprises a cellulosic material, such as for example, a fiberboard mat. Preferably, the embodiments shown comprise a nominal caliper ranging between 0.100 inch and 0.130 inch molded product made using a dry process fiberboard mat, comprising approximately 1% to approximately 15% urea formaldehyde resin and approximately 0% to approximately 4% wax, initially approximately two inches thick, and molded under a temperature of approximately 250 degrees F. to approximately 550 degrees F. and a pressure of approximately 400 pounds per square inch (psi) to approximately 1000 psi. Most preferably, the temperature is 300 degrees F. Alternatively, a phenol formaldehyde resin is used for the fiberboard mat, which is molded under a temperature of approximately 350 degrees F. to 400 degrees F.

In the exemplary embodiments shown in the figures, two sheets forming the exterior surfaces of a door are molded in separate molds and then laminated or adhered to a core, frame, or other support to simulate a solid, natural wood door. Alternatively, the two sheets can be molded from the same mold. The principles of the present invention can be applied to molded articles in addition to those shown here, such as for example, cabinet doors, wall paneling, siding, and the like.

Referring now to FIG. 1, a perspective view of a skin 10 according to the principles of the present invention is shown. The skin 10 includes a sheet 20 having a first surface 22 and a second surface 24 (see FIG. 2). Planar surfaces of the first and second surfaces 22, 24 are generally parallel to one another. Generally, a perpendicular distance $D_1$ between the planar surfaces of the first surface 22 and the second surface 24 typically is between approximately 0.100 inches and 0.130 inches. In one embodiment, the distance $D_1$ is between 0.110 inches and 0.120 inches. Typically, the sheet 20 comprises a cellulosic material. In one embodiment, the sheet 20 is a fiberboard mat having a density in a range between approximately 50 and approximately 70 pounds per cubic foot (pcf). Alternatively, other suitable materials and densities can be used.

In one embodiment, the sheet 20 includes six molded depressions, 31, 32, 33, 34, 35, and 36, which surround six panels 41, 42, 43, 44, 45, and 46. Alternatively, other suitable number of depressions and panels can be used. Each depression 31, 32, 33, 34, 35, and 36 is completely surrounded by the first surface 22 of the sheet 20. In one embodiment, the depressions 31, 32, 33, 34, 35, and 36 are substantially rectangular in shape and surround the panels 41, 42, 43, 44, 45, and 46. Alternatively, other suitable configurations can be used.

Figure 2:
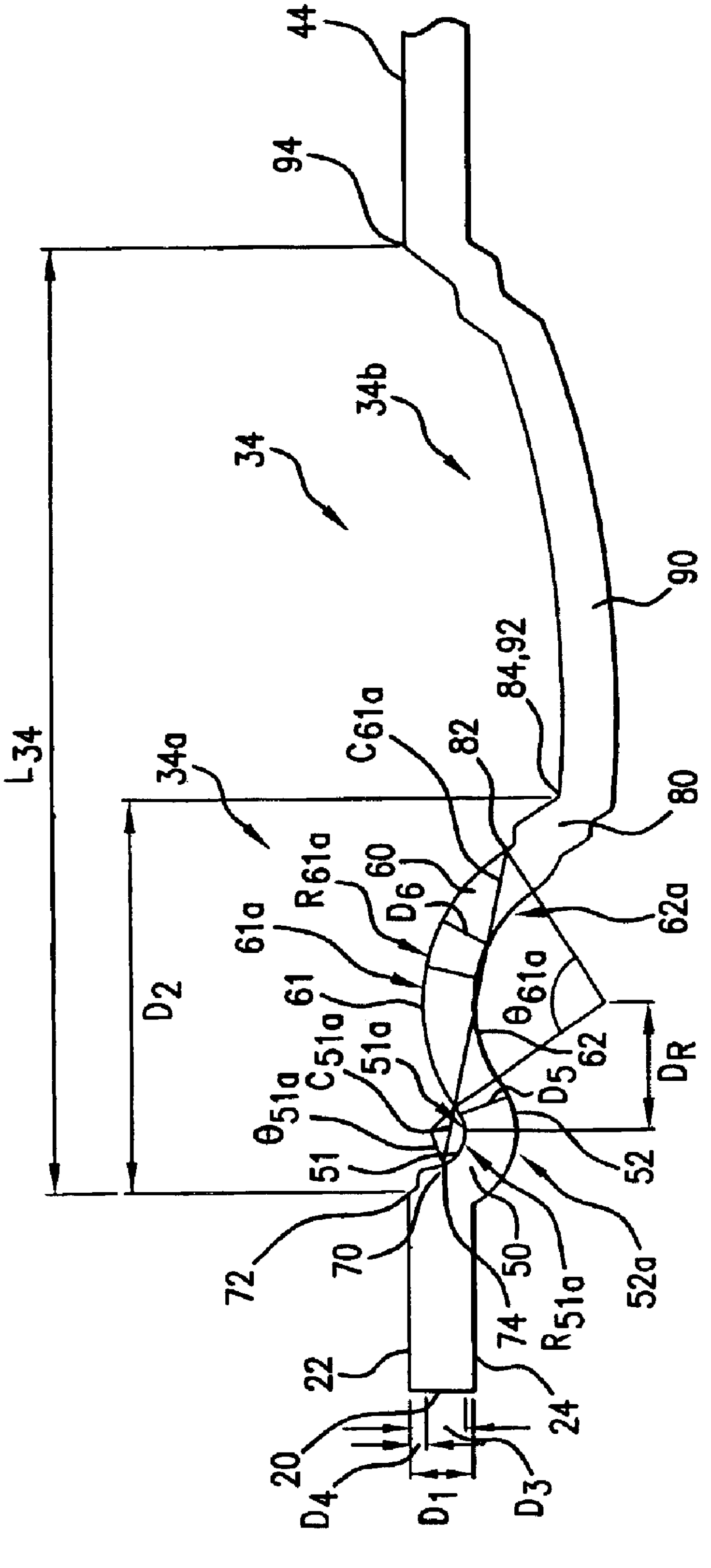
FIG. 2 is a view of the skin of FIG. 1 taken along line A—A.

Referring now to FIG. 2, a view of the molded depression 34 of the sheet 20 of FIG. 1 taken along line A—A is shown. The molded depression 34 typically includes an upper contour 34*a* and a lower contour 34*b*. The upper contour 34*a*includes an upper inclined wall 70 and a lower inclined wall 80. The lower contour 34*b* includes a lower contour wall 90. Disposed between the upper inclined wall 70 and the lower inclined wall 80 are a first arcuate portion 50 and a second arcuate portion 60. The upper and lower inclined walls 70, 80 and first and second arcuate portions 50, 60 are integral with the sheet 20.

Typically, the upper inclined wall 70 includes a first end 72 and a second end 74, and the lower inclined wall 80 includes a first end 82 and a second end 84. The lower contour wall 90 includes a first end 92 and a second end 94. In one embodiment, the first end 72 of the upper inclined wall 70 is adjacent to the first surface 22 of the sheet 20, and the second end 74 is adjacent to the first arcuate portion 50.

Generally, the first end 82 of the lower inclined wall 80 is adjacent to the second arcuate portion 60, and the second end 84 is adjacent to the first end 92 of the lower contour wall 90. In one embodiment, the second end 84 of the lower inclined wall 80 adjoins the first end 92 of the lower contour wall 90. Generally, the second end 94 of the lower contour wall 90 is adjacent to the panel 44.

A length $L_{34}$ of the molded depression 34 measured from the first end 72 of the upper inclined wall 70 to the second end 94 of the lower contour wall 90 generally is greater than 1.979 inches. The length $L_{34}$ is measured substantially parallel to the planar surface of the first surface 22. In one embodiment, the length $L_{34}$ of the molded depression 34 is approximately 2.012 inches. Alternatively, other suitable lengths for the molded depression 34 can be used.

Generally, a ratio of a surface distance from the first end 72 of the upper inclined wall 70 to the second end 94 of the lower contour wall to the length $L_{34}$ is less than 1.159. In one embodiment, the ratio of the surface distance from the first end 72 of the upper inclined wall 70 to the second end 94 of the lower contour wall to the length $L_{34}$ is in a range between greater than 1.135 and less than 1.159. In another embodiment, the ratio of the surface distance from the first end 72 of the upper inclined wall 70 to the second end 94 of the lower contour wall to the length $L_{34}$ is approximately 1.147. Surface distance is a measurement along an entire length of a line or contour, rather than a linear distance, between a beginning point and an end point of the line or contour. Thus, a surface distance of a line that includes arcs or contours typically is greater than a corresponding linear, distance.

A distance $D_2$ measured from the first end 72 of the upper inclined wall 70 to the second end 84 of the lower inclined wall 80 is less than 0.862 inches. In one embodiment, the distance $D_2$ is approximately 0.853 inches. Alternatively, other suitable distances can be used. In one embodiment, a ratio of a surface distance from the first end 72 of the inclined wall 70 to the second end 84 of the lower inclined wall 80 to the distance $D_2$ is less than 1.256. In one embodiment, the ratio of the surface distance from the first end 72 of the inclined wall 70 to the second end 84 of the lower inclined wall 80 to the distance $D_2$ is approximately 1.236.

The first arcuate portion 50 includes a first surface 51 and a second surface 52. The first surface 51 of the first arcuate portion 50 includes an arc 51*a*. The second surface 52 of the first arcuate portion 50 includes an arc 52*a*. Alternatively, rather than a substantially continuous arc, multiple lines, arcs, and/or contours can be joined together to form arcs 51*a* and 52*a*. In one embodiment, the arc 51*a* includes a concave shape. In another embodiment, the arc 51*a* includes a convex shape. An angle $\theta_{51a}$ forming the arc 51*a* of the first surface 51 of the first arcuate portion 50 is greater than 110 degrees. In one embodiment, the angle $\theta_{51a}$ is approximately 118 degrees.

The second arcuate portion 60 is adjacent to the first arcuate portion 50. In one embodiment, the first and second arcuate portions 50, 60 are adjoining. The second arcuate portion 60 includes a first surface 61 and a second surface 62. The first surface 61 of the second arcuate portion 60 includes an arc 61*a*. The second surface 62 of the second arcuate portion 60 includes an arc 62*a*. Alternatively, rather than a substantially continuous arc, multiple lines, arcs, and/or contours can be joined together to form arcs 61*a* and 62*a*. In one embodiment, the arc 62*a* includes a concave shape. In another embodiment, the arc 62*a* includes a convex shape.

An angle $\theta_{61a}$ forming the arc 61*a* of the first surface 61 of the second arcuate portion 60 is less than 102 degrees. In one embodiment, the angle $\theta_{61a}$ is approximately 93 degrees. A ratio of the angle $\theta_{61a}$ to the angle $\theta_{51a}$ is less than 0.927. In one embodiment, the ratio of the angle $\theta_{61a}$ to the angle $\theta_{51a}$ (i.e., $\theta_{61a}/\theta_{51a}$) is approximately 0.788.

A radius $R_{51a}$ of the arc 51*a* of the first surface 51 of the first arcuate portion 50 is greater than 0.068 inches and a radius $R_{61a}$ of the arc 61*a* of the first surface 61 of the second arcuate portion 60 is greater than 0.350 inches. In one embodiment, the radius $R_{51a}$ is approximately 0.074 inches and the radius $R_{61a}$ is approximately 0.376 inches. Typically, a ratio of the radius $R_{61a}$ to the radius $R_{51a}$ (i.e., $R_{61a}/R_{51a}$) is less than 5.147. In one embodiment, the ratio of $R_{61a}/R_{51a}$ is approximately 5.081. Typically, a linear distance $D_R$ between the radius $R_{51a}$ and the radius $R_{61a}$ is less than 0.278 inches. In one embodiment, the distance $D_R$ is approximately 0.270 inches. Linear distances are generally measured substantially parallel to the planar surface of the first surface 22 or the second surface 24.

A ratio of a length of the arc 51*a* to a length of a chord $C_{51a}$ of the arc 51*a* is less than 1.18. In one embodiment, the ratio of the length of the arc 51*a* to the length of the chord $C_{51a}$ of the arc 51*a* is approximately 1.118. Generally, the length of the arc 51*a* is greater than 0.131 inches and the length of the chord $C_{51a}$ is greater than 0.111 inches. In one embodiment, the length of the arc 51*a* is approximately 0.142 inches and the length of the chord $C_{51a}$ is approximately 0.127 inches.

A ratio of a length of the arc 61*a* to a length of a chord $C_{61a}$ of the arc 61*a* is less than 1.15. In one embodiment, the ratio of the length of the arc 61*a* to the length of the chord $C_{61a}$ of the arc 61*a* is in a range between 1.045 and less than 1.150. In another embodiment, the ratio of the length of the arc 61*a* to the length of the chord $C_{61a}$ of the arc 61*a* is approximately 1.122. Generally, the length of the arc 61*a* is less than 0.628 inches and the length of the chord $C_{61a}$ is greater than 0.546 inches. In one embodiment, the length of the arc 61*a* is approximately 0.614 inches and the length of the chord $C_{61a}$ is approximately 0.547 inches.

In one embodiment, a maximum perpendicular distance $D_3$ between the first surface 22 of the sheet 20 and the first surface 51 of the first arcuate portion 50 is less than the distance between the first and second surfaces 22, 24 of the sheet 20, i.e., $D_1$. As described above, $D_1$ typically is between approximately 0.110 inches and 0.120 inches. Generally, the distance $D_3$ is in a range between approximately 0.033 inches and less than 0.133 inches. In one embodiment, the distance $D_3$ is approximately 0.118 inches.

A minimum perpendicular distance $D_4$ between the first surface 22 of the sheet 20 and the first surface 61 of the second arcuate portion 60 typically is less than the distance $D_3$. In one embodiment the distance $D_4$ is approximately 0.027 inches. A ratio of the distance $D_3$ to the distance $D_4$ generally is less than 4.926. In one embodiment, the ratio of the distance $D_3/D_4$ is approximately 4.370.

In one embodiment, a perpendicular distance $D_5$ between the first and second surfaces 51, 52 of the first arcuate portion 50 is in a range between approximately 0.095 inches and approximately 0.107 inches. In another embodiment, the distance $D_5$ is in a range between approximately 0.097 inches and 0.100 inches. Typically, a ratio of the distance $D_5$ to the distance $D_1$ is in a range between approximately 0.760 and approximately 0.860. Alternatively other suitable distances can be used.

In one embodiment, a perpendicular distance $D_6$ between the first and second surfaces 61, 62 of the second arcuate portion 60 typically is in a range between approximately 0.095 inches and approximately 0.107 inches. In another embodiment, the distance $D_6$ is in a range between approximately 0.099 inches and approximately 0.105 inches. Typically, a ratio of the distance $D_6$ to the distance $D_1$ is in a range between approximately 0.760 and approximately 0.860. Alternatively other suitable distances can be used.

One formula that is used to describe several of the relationships described above is that the ratio of the length of the arc 61*a* to the length of the chord $C_{61a}$ of the arc 61*a* is less than 1.150.

Figure 3:
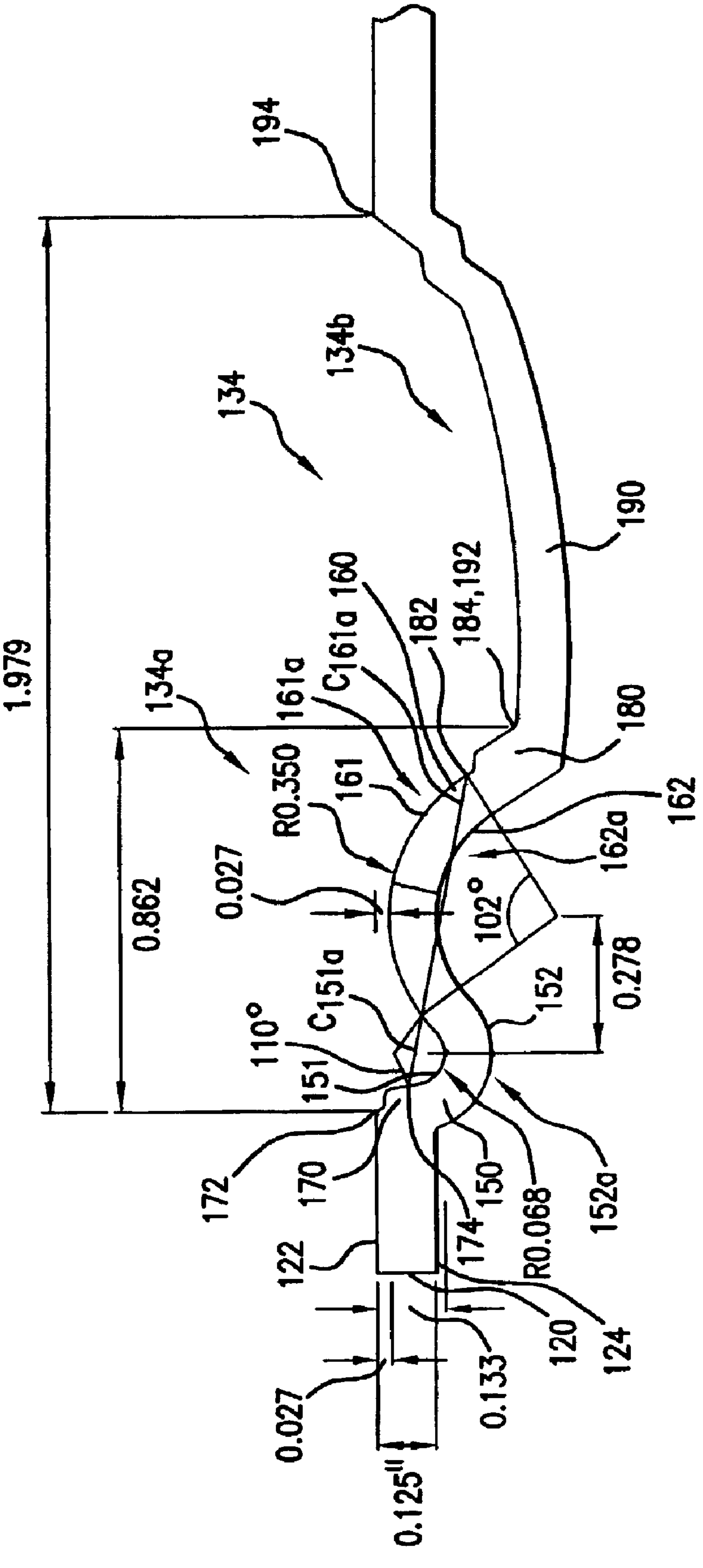
FIG.3 PRIOR ART
FIG. 3 is a view of a prior art skin.

The profile of a prior art molded depression 134 in a prior art sheet 120, shown in FIG. 3 does not achieve the curvature that the profile of the molded depression 34 according to the present invention achieves while maintaining the proper density of the mat. When a fiberboard mat is molded, i.e., stretched, to include two adjacent bends of at least 90 degrees, the added contours increase the amount of surface distance of the mat compared to a substantially flat mat. The prior art, which is described below and shown in FIG. 3, stretches the fiberboard mat farther than desirable. In the prior art, this over-stretching results in surface discontinuities and flaws. Additionally, the density of the fiberboard mat of the prior art is such that paint, stains, and other finishes do not properly adhere to the surface of the mat. The present invention identifies an optimum limit for molding a fiberboard mat that includes two adjacent curvatures while maintaining a desirable surface appearance.

The length of the molded depression 134 is 1.979 inches. The surface distance of the molded depression 134 measured from the first end 172 of the upper inclined wall 170 to the second end 194 of the lower contour wall 190 is 2.294 inches. Thus, the ratio of the surface distance of the molded depression 134 to the length of the molded depression 134 is 1.159.

The linear distance measured from the first end 172 of the upper inclined wall 170 to the second end 184 of the lower inclined wall 180 is 0.862 inches, and the surface distance is 1.083 inches. This linear distance is measured substantially parallel to the planar surface of the first surface 122. Thus, the ratio of the surface distance of 1.083 inches to the linear distance of 0.862 inches (i.e., 1.083/0.862) is 1.256.

The angle forming the arc of the first surface 151 of the first arcuate portion 150 is 110 degrees. The angle forming the arc of the first surface 161 of the second arcuate portion 160 is 102 degrees. Thus, the ratio of the angle forming the arc of the first surface 161 of the second arcuate portion to the angle forming the arc of the first surface 151 of the first arcuate portion 150 (i.e., 102/110) is 0.927.

The radius of the arc of the first surface 151 of the first arcuate portion 150 is 0.068 inches and the radius of the arc of the first surface 161 of the second arcuate portion 160 is 0.350 inches. The ratio of the radius of the arc of the first surface 161 of the second arcuate portion 160 to the radius of the arc of the first surface 151 of the first arcuate portion 150 (i.e., 0.350/0.068) is 5.147. The distance between these two radii is 0.278 inches.

The ratio of the length of the arc 161*a* to the length of the chord $Cl_{161a}$ of the arc 61*a* is 1.150. The maximum perpendicular distance between the first surface 122 of the sheet 120 and the first surface 151 of the first arcuate portion 150 is 0.133 inches, which is greater than the perpendicular distance between the first and second surfaces 122, 124 of the sheet 120, i.e., 0.125 inches.

The minimum perpendicular distance between the first surface 122 of the sheet 120 and the first surface 161 of the second arcuate portion 160 is 0.027 inches. A ratio of the maximum perpendicular distance between the first surface 122 of the sheet 120 and the first surface 151 of the first arcuate portion 150 and the minimum perpendicular distance between the first surface 122 of the sheet 120 and the first surface 161 of the second arcuate portion 160 (i.e., 0.133/0.027) is 4.926.

The perpendicular distance between the first and second surfaces 151, 152 of the first arcuate portion 150 is in a range between 0.091 inches and 0.097 inches. The distance between the first and second surfaces 161, 162 of the second arcuate portion 160 is in a range between 0.090 inches and 0.100 inches.

The prior art skin, shown in FIG. 3, does not achieve the adjacent half-round curvatures that the profile of the molded depression 34 according to the present invention achieves. For example, in one embodiment of the present invention, the angle $\theta_{51a}$ forming the arc 51*a* of the first surface 51 of the first arcuate portion 50 is approximately 118 degrees, whereas the angle forming the arc 151*a* of the prior art door skin is 110 degrees. The angle $\theta_{61a}$ forming the arc 61*a* of the first surface of the second arcuate portion 60 is, in one embodiment, approximately 93 degrees, whereas the angle forming the arc 161*a* of the prior art door skin is 102 degrees.

As discussed above, one formula that is used to describe several of the relationships of the embodiment according to the present invention is that the ratio of the length of the arc 61*a* to the length of the chord $C_{61a}$ of the arc 61*a* is less than 1.150. In the prior art skin, such a ratio, i.e., the length of the arc 161*a* to the length of the chord $C_{161a}$ of the arc 161*a*, is 1.150.

Figure 4:
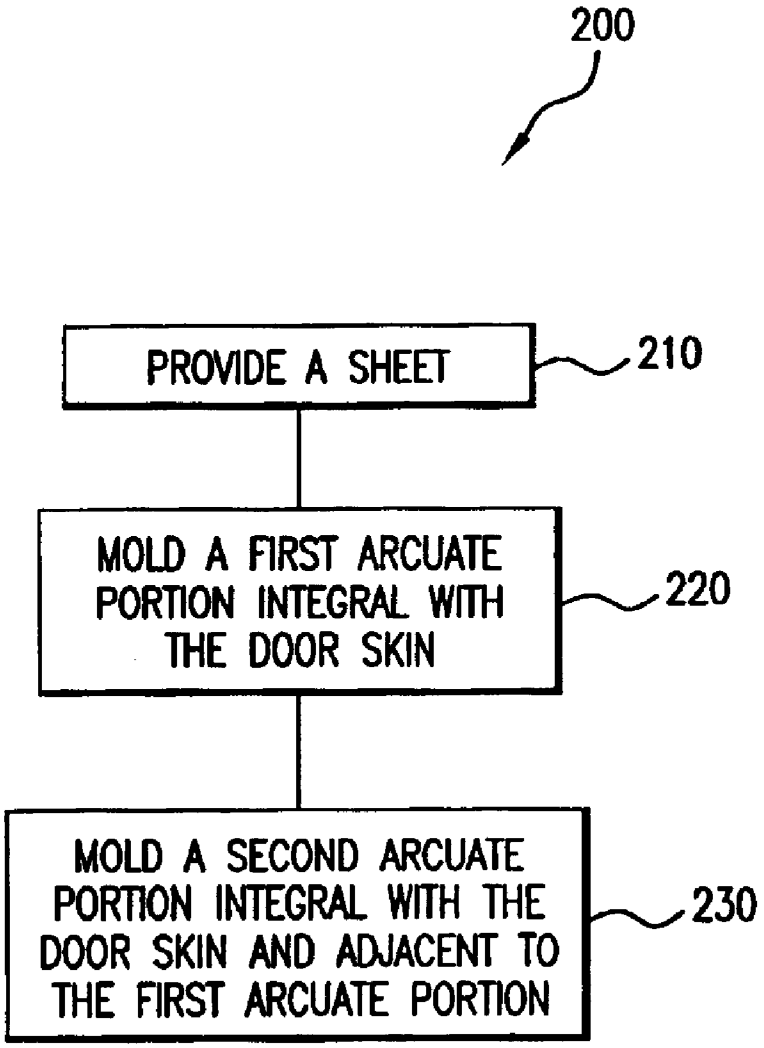
FIG. 4 is a block diagram of a method according to an embodiment of the invention.

Referring now to FIG. 4, a method 200 according to an embodiment of the present invention is shown. FIG. 4 shows an embodiment of a method 200 of making a skin that provides a molded depression comprising two adjacent "half-round" arcuate portions. The method 200 may be employed to make the sheet 20 for use in the skin 10 described above. Items shown in FIGS. 1 and 2 are referred to in describing FIG. 4 to aid understanding of the embodiment of the method 200 shown. However, embodiments of methods according to the present invention may be employed to make a wide variety of other products, including, without limitation, cabinet doors, wall paneling, siding, and the like.

As indicated by block 210, a sheet comprising cellulosic material is provided. The sheet comprises a first surface and a second surface. In one embodiment, the sheet comprises a fiberboard having a density in a range between approximately 50 pcf and approximately 70 pcf.

As indicated by block 220, a first arcuate portion integral with the sheet is molded. The first arcuate portion comprises a first surface and a second surface, each comprising an arc. Alternatively, rather than a substantially continuous arc, multiple lines, arcs, and/or contours can be joined together to form the arc. In one embodiment, the first arcuate portion comprises a concave shape. In another embodiment, the first arcuate portion comprises a convex shape.

Typically, an angle forming the arc of the first surface of the first arcuate portion is greater than 110 degrees. In one embodiment, the angle forming the arc of the first surface of the first arcuate portion is approximately 118 degrees. Alternatively, other suitable angles can be used. A radius of the arc of the first surface of the first arcuate portion is greater than 0.068 inches. In one embodiment, the radius, of the arc of the first surface of the first arcuate portion is approximately 0.074 inches.

Typically, a length of a chord of the arc of the first surface of the first arcuate portion generally is greater than 0.111 inches. In one embodiment, a ratio of the length of the arc of the first surface of the first arcuate portion to the length of the chord of the arc of the first surface of the first arcuate portion is less than 1.180. In another embodiment, the ratio of the length of the arc of the first surface of the first arcuate portion to the length of the chord of the arc of the first surface of the first arcuate portion is approximately 1.118.

As indicated by block 230, a second arcuate portion integral with the sheet and adjacent to the first arcuate portion is molded. In one embodiment, the first and second arcuate portions are adjoining. The second arcuate portion comprises a first surface and a second surface, each comprising an arc. Alternatively, rather than a substantially continuous arc, multiple lines, arcs, and/or contours can be joined together to form the arc. In one embodiment, the second arcuate portion comprises a convex shape. In another embodiment, the second arcuate portion comprises a concave shape.

An angle forming the arc of the first surface of the second arcuate portion is less than 102 degrees. In one embodiment, the angle forming the arc of the first surface of the second arcuate portion is approximately 93 degrees. A ratio of the angle forming the arc of the first surface of the second arcuate portion to the angle forming the arc of the first surface of the first arcuate portion generally is less than 0.927. In one embodiment, the ratio of the angle forming the arc of the first surface of the second arcuate portion to the angle forming the arc of the first surface of the first arcuate portion is approximately 0.788.

Typically, a radius of the arc of the first surface of the second arcuate portion is greater than 0.350 inches. In one embodiment, the radius of the arc of the first surface of the second arcuate portion is approximately 0.376 inches. Generally, a distance between a center of the radius of the arc of the first surface of the first arcuate portion and a center of the radius of the arc of the first surface of the second arcuate portion is less than 0.278 inches.

In one embodiment, the distance between a center of the radius of the arc of the first surface of the first arcuate portion and a center of the radius of the arc of the first surface of the second arcuate portion is approximately 0.270 inches. Typically, a ratio of the radius of the arc of the first surface of the first arcuate portion to the radius of the arc of the first surface of the second arcuate portion is greater than approximately 0.194.

Typically, a length of a chord of the arc of the first surface of the second arcuate portion is greater than 0.546 inches. A ratio of a length of the arc of the first surface of the second arcuate portion to the length of the chord of the arc of the first surface of the second arcuate portion generally is less than 1.150. In one embodiment, the ratio of the length of the arc of the first surface of the second arcuate portion to the length of the chord of the arc of the first surface of the second arcuate portion comprises a range between 1.045 and less than 1.150.

The relationships described above are used in the method 200 to make the skin according to the present invention. These relationships are defined in one formula, which requires that the ratio of a length of the arc of the first surface of the second arcuate portion to the length of the chord of the arc of the first surface of the second arcuate portion is less than 1.150.

In the method 200, a maximum perpendicular distance between the first surface of the sheet and the first surface of the first arcuate portion generally is less than a perpendicular distance between the first and second surfaces of the sheet. Typically, the perpendicular distance between the first and second surfaces of the sheet is approximately 0.125 inches. In one embodiment, the maximum perpendicular distance between the first surface of the sheet and the first surface of the first arcuate portion is in a range between approximately 0.090 inches and less than 0.133 inches. In another embodiment, the perpendicular distance between the first surface of the sheet and the first surface of the first arcuate portion is approximately 0.118 inches.

Generally, a ratio of the maximum perpendicular distance between the first surface of the sheet and the first surface of the first arcuate portion to a minimum perpendicular distance between the first surface of the sheet and the first surface of the second arcuate portion is less than 4.926.

In one embodiment, the method 200 further comprises providing an upper inclined wall, providing a lower inclined wall, and providing a lower contour wall. The upper inclined wall comprises a first end and a second end. The lower inclined wall comprises a first end and a second end. The first and second arcuate portions are disposed between the second end of the upper inclined wall and the first end of the lower inclined wall. The lower contour wall comprises a first end and a second end. The first end of the lower contour wall is adjacent to the second end of the lower inclined wall.

Generally, a linear distance between the first end of the upper inclined wall and the second end of the lower inclined wall is less than 0.862 inches. Generally, linear distances are measured substantially parallel to the planar surface of the first surface of the sheet. In one embodiment, the linear distance between the first end of the upper inclined wall and the second end of the lower inclined wall is approximately 0.853 inches. A ratio of a surface distance from the first end of the upper inclined wall to the second end of the lower inclined wall and the linear distance between the first end of the upper inclined wall and the second end of the lower inclined wall is less than 1.256. In another embodiment, the ratio of a surface distance from the first end of the upper inclined wall to the second end of the lower inclined wall and the linear distance between the first end of the upper inclined wall and the second end of the lower inclined wall is approximately 1.236.

Generally, a linear distance between the first end of the upper inclined wall and the second end of the lower contour wall is greater than 1.979 inches. A ratio of a surface distance from the first end of the upper inclined wall to the second end of the lower contour wall to the linear distance between the first end of the upper inclined wall and the second end of the lower contour wall is less than 1.159.

Typically, a perpendicular distance between the first and second surfaces of the first arcuate portion is in a range between approximately 0.095 and approximately 0.107 inches. In one embodiment, the perpendicular distance between the first and second surfaces of the first arcuate portion is in a range between approximately 0.097 and approximately 0.100 inches. Generally, a ratio of the perpendicular distance between the first and second surfaces of the first arcuate portion to the perpendicular distance between the first and second surfaces of the sheet is in a range between approximately 0.760 and approximately 0.860.

Also typically, a perpendicular distance between the first and second surfaces of the second arcuate portion is in a range between approximately 0.095 inches and approximately 0.107 inches. In one embodiment, the perpendicular distance between the first and second surfaces of the second arcuate portion is in a range between approximately 0.099 inches and approximately 0.105 inches. Generally, a ratio of the perpendicular distance between the first and second surfaces of the second arcuate portion to the perpendicular distance between the first and second surfaces of the sheet is in a range between approximately 0.760 and approximately 0.860.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. A skin comprising:

a sheet comprising a cellulosic material, the sheet further comprising a first surface and a second surface;

a first arcuate portion integral with the sheet, the first arcuate portion comprising a first surface and a second surface, the first and second surfaces of the first arcuate portion each comprising an arc; and a second arcuate portion integral with the sheet and adjacent to the first arcuate portion, the second arcuate portion comprising a first surface and a second surface, the first and second surfaces of the second arcuate portion each comprising an arc, wherein an angle forming the arc of the first surface of the first arcuate portion is at least approximately 118 degrees and an angle forming the arc of the first surface of the second arcuate portion is no greater than approximately 93 degrees.

2. The skin of claim 1, wherein the sheet comprises a fiberboard having a density in a range between approximately 50 pounds per cubic foot and approximately 70 pounds per cubic foot.

3. The skin of claim 1, wherein the first arcuate portion comprises a concave shape and the second arcuate portion comprises a convex shape.

4. The skin of claim 1, wherein the first arcuate portion comprises a convex shape and the second arcuate portion comprises a concave shape.

5. The skin of claim 1, wherein a radius of the arc of the first surface of the first arcuate portion is greater than 0.068 inches and a radius of the arc of the first surface of the second arcuate portion is greater than 0.350 inches.

6. The skin of claim 5, wherein a ratio of the radius of the arc of the first surface of the second arcuate portion to the radius of the arc of the first surface of the first arcuate portion is less than 5.147.

7. The skin of claim 5, wherein a distance between a center of the radius of the arc of the first surface of the first arcuate portion and a center of the radius of the arc of the first surface of the second arcuate portion is less than 0.278 inches.

8. The skin of claim 5, wherein a ratio of a length of the arc of the first surface of the second arcuate portion to a length of a chord of the arc of the first surface of the second arcuate portion comprises less than 1.145.

9. The skin of claim 8, wherein the length of the chord of the arc of the first surface of the second arcuate portion is at least 0.547 inches.

10. The skin of claim 1, wherein a ratio of the angle forming the arc of the first surface of the second arcuate portion to the angle forming the arc of the first surface of the first arcuate portion is less than 0.927.

11. The skin of claim 1, wherein a length of a chord of the arc of the first surface of the first arcuate portion is greater than 0.113 inches.

12. The skin of claim 1, further comprising:

an upper inclined wall comprising a first end and a second end;

a lower inclined wall comprising a first end and a second end, the first and second arcuate portions being disposed between the second end of the upper inclined wall and the first end of the lower inclined wall; and a lower contour wall comprising a first end and a second end, the first end of the lower contour wall adjacent to the second end of the lower inclined wall.

13. The skin of claim 12, wherein a linear distance between the first end of the upper inclined wall and the second end of the lower inclined wall is less than 0.862 inches.

14. The skin of claim 13, wherein a ratio of a surface distance from the first end of the upper inclined wall to the second end of the lower inclined wall to the linear distance between the first end of the upper inclined wall and the second end of the lower inclined wall is less than 1.256.

15. The skin of claim 12, wherein a linear distance between the first end of the upper inclined wall and the second end of the lower contour wall is greater than 1.979 inches.

16. The skin of claim 15, wherein a ratio of a surface distance from the first end of the upper inclined wall to the second end of the lower contour wall to the linear distance between the first end of the upper inclined wall and the second end of the lower contour wall is less than 1.159.

17. The skin of claim 1, wherein a maximum perpendicular distance between the first surface of the sheet and the first surface of the first arcuate portion is in a range between approximately 0.033 inches and less than 0.133 inches and wherein a minimum perpendicular distance between the first surface of the sheet and the first surface of the second arcuate portion is less than the maximum perpendicular distance between the first surface of the sheet and the first surface of the first arcuate portion.

18. The skin of claim 17, wherein a ratio of the maximum perpendicular distance between the first surface of the sheet and the first surface of the first arcuate portion to the minimum perpendicular distance between the first surface of the sheet and the first surface of the second arcuate portion is less than 4.926.

19. The skin of claim 1, wherein the sheet is coupled to an inner structure, thereby forming a door.

20. A method of making a skin, the method comprising:

providing a sheet comprising a cellulosic material, the sheet further comprising a first surface and a second surface;

molding a first arcuate portion integral with the sheet, the first arcuate portion comprising a first surface and a second surface, the first and second surfaces of the first arcuate portion each comprising an arc; and molding a second arcuate portion integral with the sheet and adjacent to the first arcuate portion, the second arcuate portion comprising a first surface and a second surface, the first and second surfaces of the second arcuate portion each comprising an arc, wherein an angle forming the arc of the first surface of the first arcuate portion is at least approximately 118 degrees and an angle forming the arc of the first surface of the second arcuate portion is no greater than approximately 93 degrees.

21. The method of claim 20, wherein the sheet comprises a fiberboard having a density in a range between approximately 50 and approximately 70 pounds per cubic foot.

22. The method of claim 20, wherein the first arcuate portion comprises a concave shape and the second arcuate portion comprises a convex shape.

23. The method of claim 20, wherein the first arcuate portion comprises a convex shape and the second arcuate portion comprises a concave shape.

24. The method of claim 20, wherein a radius of the arc of the first surface of the first arcuate portion is greater than 0.068 inches and a radius of the arc of the first surface of the second arcuate portion is greater than 0.350 inches.

25. The method of claim 24, wherein a ratio of the radius of the arc of the first surface of the first arcuate portion to the radius of the arc of the first surface of the second arcuate portion is less than 5.147.

26. The method of claim 24, wherein a distance between a center of the radius of the arc of the first surface of the first arcuate portion and a center of the radius of the arc of the first surface of the second arcuate portion is less than 0.278 inches.

27. The method of claim 24, wherein a length of a chord of the arc of the first surface of the second arcuate portion is at least 0.547 inches.

28. The method of claim 27, wherein a ratio of a length of the arc of the first surface of the second arcuate portion to the length of the chord of the arc of the first surface of the second arcuate portion comprises less than 1.145.

29. The method of claim 20, wherein a ratio of the angle forming the arc of the first surface of the second arcuate portion to the angle forming the arc of the first surface of the first arcuate portion is less than 0.927.

30. The method of claim 20, wherein a length of a chord of the arc of the first surface of the first arcuate portion is greater than 0.113 inches.

31. The method of claim 20, further comprising:

providing an upper inclined wall comprising a first end and a second end;

providing a lower inclined wall comprising a first end and a second end, the first and second arcuate portions being disposed between the second end of the upper inclined wall and the first end of the lower inclined wall; and providing a lower contour wall comprising a first end and a second end, the first end of the lower contour wall adjacent to the second end of the lower inclined wall.

32. The method of claim 31, wherein a linear distance between the first end of the upper inclined wall and the second end of the lower inclined wall is less than 0.862 inches.

33. The skin of claim 32, wherein a ratio of a surface distance from the first end of the upper inclined wall to the second end of the lower inclined wall to the linear distance between the first end of the upper inclined wall and the second end of the lower inclined wall is less than 1.256.

34. The skin of claim 31, wherein a linear distance between the first end of the upper inclined wall and the second end of the lower contour wall is greater than 1.979 inches.

35. The skin of claim 34, wherein a ratio of a surface distance from the first end of the upper inclined wall to the second end of the lower contour wall to the linear distance between the first end of the upper inclined wall and the second end of the lower contour wall is less than 1.159.

36. The method of claim 20, wherein a maximum perpendicular distance between the first surface of the sheet and the first surface of the first arcuate portion is in a range between approximately 0.033 inches and less than 0.133 inches and wherein a minimum perpendicular distance between the first surface of the sheet and the first surface of the second arcuate portion is less than the maximum perpendicular distance between the first surface of the sheet and the first surface of the first arcuate portion.

37. The method of claim 36, wherein a ratio of the maximum perpendicular distance between the first surface of the sheet and the first surface of the first arcuate portion to the minimum perpendicular distance between the first surface of the sheet and the first surface of the second arcuate portion is less than 4.926.

38. The method of claim 20, further comprising coupling a sheet to an inner structure, thereby forming a door.

39. The skin of claim 1, wherein the angle forming the arc of the first surface of the first arcuate portion is approximately 118 degrees and the angle forming the arc of the first surface of the second arcuate portion is approximately 93 degrees.

40. The method of claim 20, wherein the angle forming the arc of the first surface of the first arcuate portion is approximately 118 degrees and the angle forming the arc of the first surface of the second arcuate portion is approximately 93 degrees.

41. A skin comprising:

a sheet comprising a cellulosic material, the sheet further comprising a first surface and a second surface;

a first arcuate portion integral with the sheet, the first arcuate portion comprising a first surface and a second surface, the first and second surfaces of the first arcuate portion each comprising an arc; and a second arcuate portion integral with the sheet and adjacent to the first arcuate portion, the second arcuate portion comprising a first surface and a second surface, the first and second surfaces of the second arcuate portion each comprising an arc, wherein a ratio of a length of the arc of the first surface of the second arcuate portion to a length of a chord of the arc of the first surface of the second arcuate portion comprises a range between approximately 1.045 and approximately 1.122.

42. A method of making a skin, the method comprising:

providing a sheet comprising a cellulosic material, the sheet further comprising a first surface and a second surface;

molding a first arcuate portion integral with the sheet, the first arcuate portion comprising a first surface and a second surface, the first and second surfaces of the first arcuate portion each comprising an arc; and molding a second arcuate portion integral with the sheet and adjacent to the first arcuate portion, the second arcuate portion comprising a first surface and a second surface, the first and second surfaces of the second arcuate portion each comprising an arc, wherein a ratio of a length of the arc of the first surface of the second arcuate portion to a length of a chord of the arc of the first surface of the second arcuate portion comprises a range between approximately 1.045 and approximately 1.122.

* * * * *

UNITED STATES PATENT AND TRADEMARK OFFICE

CERTIFICATE OF CORRECTION

PATENT NO. : 7,022,414 B2
APPLICATION NO. : 10/426573
DATED : April 4, 2005
INVENTOR(S) : Davina et al.

It is certified that error appears in the above-identified patent and that said Letters Patent is hereby corrected as shown below:

In column 3 , line 53 , --34aincludes-- should read --34a includes--.

In column 6, line 59 , --$C1_{161a}$-- should read --$C_{161a}$--.

Signed and Sealed this

Fifth Day of September, 2006

JON W. DUDAS
*Director of the United States Patent and Trademark Office*

UNITED STATES PATENT AND TRADEMARK OFFICE

CERTIFICATE OF CORRECTION

PATENT NO. : 7,022,414 B2 Page 1 of 1
APPLICATION NO. : 10/426573
DATED : April 4, 2006
INVENTOR(S) : Davina et al.

It is certified that error appears in the above-identified patent and that said Letters Patent is hereby corrected as shown below:

In column 3 , line 53 , --34aincludes-- should read --34a includes--.

In column 6, line 59 , --$C1_{161a}$-- should read --$C_{161a}$--.

This certificate supersedes Certificate of Correction issued September 5, 2006.

Signed and Sealed this

Seventh Day of November, 2006

JON W. DUDAS
*Director of the United States Patent and Trademark Office*